(12) United States Patent
Zancanato et al.

(10) Patent No.: US 10,976,150 B2
(45) Date of Patent: Apr. 13, 2021

(54) COMPUTING SYSTEM IMPLEMENTING AN ALGORITHM FOR FUSING DATA FROM INERTIAL SENSORS, AND METHOD

(71) Applicant: STMICROELECTRONICS S.r.l., Agrate Brianza (IT)

(72) Inventors: Alberto Zancanato, Milan (IT); Michele Ferraina, Milan (IT); Federico Rizzardini, Milan (IT); Stefano Paolo Rivolta, Desio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 355 days.

(21) Appl. No.: 15/987,637

(22) Filed: May 23, 2018

(65) Prior Publication Data

US 2018/0340768 A1 Nov. 29, 2018

(30) Foreign Application Priority Data

May 25, 2017 (IT) .......................... 102017000057066

(51) Int. Cl.
*G01B 7/30* (2006.01)
*G01P 15/14* (2013.01)
(Continued)

(52) U.S. Cl.
CPC ................ *G01B 7/30* (2013.01); *G01P 15/14* (2013.01); *G01P 15/18* (2013.01); *G06F 1/1616* (2013.01); *G06F 1/1677* (2013.01); *G06F 1/1694* (2013.01)

(58) Field of Classification Search
CPC . G01B 7/30; G01P 15/14; G01P 15/18; G06F 1/1616; G06F 1/1677; G06F 1/1694
See application file for complete search history.

(56) References Cited

U.S. PATENT DOCUMENTS 9,612,625 B2 4/2017 Oliver et al.
9,707,043 B2 7/2017 Bozung
(Continued)

FOREIGN PATENT DOCUMENTS

CN 101788850 A 7/2010
CN 103678184 A 3/2014
(Continued)

*Primary Examiner* — Raymond L Nimox
(74) *Attorney, Agent, or Firm* — Seed Intellectual Property Law Group LLP

(57) ABSTRACT

A computing system includes a first hardware element having a first accelerometer and a first gyroscope, and a second hardware element having a second accelerometer and a second gyroscope. The first and second hardware elements are moveable with respect to each other. The computing system recursively generates a result signal indicative of a relative orientation of the first and second hardware elements with respect to each other. The result signal may be generated by generating a first intermediate signal indicative of a angle between the first and second hardware elements based on signals generated by the first and second accelerometers and generating a second intermediate signal indicative of the angle based on signals generated by the first and second gyroscopes. The result signal indicative of the angle may be generated as a weighted sum of the first intermediate signal and the second intermediate signal. At least one of the first and second hardware elements is controlled by on the result signal.

30 Claims, 5 Drawing Sheets

(51) Int. Cl.
    *G01P 15/18*     (2013.01)
    *G06F 1/16*     (2006.01)

(56) References Cited

U.S. PATENT DOCUMENTS

| | | |
|---|---|---|
| 10,054,444 B2 | 8/2018 | Czompo et al. |
| 10,198,086 B2 | 2/2019 | Parazynski et al. |
| 10,238,510 B2 | 3/2019 | van der Walt et al. |
| 10,386,203 B1 * | 8/2019 | Zheng ................ G01C 19/5776 |
| 10,509,466 B1 * | 12/2019 | Miller ...................... G06K 9/52 |
| 2008/0255795 A1 * | 10/2008 | Shkolnikov ............ G01P 15/00 702/141 |
| 2009/0259424 A1 * | 10/2009 | Dutta ................... G01C 25/005 702/85 |
| 2012/0259578 A1 * | 10/2012 | Bevilacqua ........... G06F 1/1694 702/141 |
| 2015/0116362 A1 * | 4/2015 | Aurongzeb .............. H04N 7/15 345/650 |
| 2015/0130725 A1 * | 5/2015 | Knepper ............... G06F 1/1643 345/173 |
| 2015/0177272 A1 | 6/2015 | Clark |
| 2016/0147266 A1 * | 5/2016 | Chng ................... G06F 1/1677 713/100 |
| 2017/0258532 A1 | 9/2017 | Shalayev et al. |
| 2017/0299388 A9 * | 10/2017 | Karahan ............... G01C 25/005 |
| 2018/0340768 A1 | 11/2018 | Zancanato et al. |

FOREIGN PATENT DOCUMENTS

| | | |
|---|---|---|
| CN | 104461330 A | 3/2015 |
| CN | 106482734 A | 3/2017 |
| EP | 2 151 734 A2 | 2/2010 |
| EP | 3 065 031 A1 | 9/2016 |

\* cited by examiner

COMPUTING SYSTEM IMPLEMENTING AN ALGORITHM FOR FUSING DATA FROM INERTIAL SENSORS, AND METHOD

BACKGROUND

Technical Field

The present disclosure relates to a computing system and to a method implemented by the computing system to calculate an angle between respective hardware elements of the computing system in a plurality of operating conditions of the computing system.

Description of the Related Art

As illustrated in FIG. 1, a portable computing device 1 of a known type (e.g., a notebook) is typically formed by two functional blocks 2, 4, in which the functional block 2 houses a display 2a and the functional block 4 houses a keyboard 4a and calculation and memory units 4b, 4c. The functional blocks 2 and 4 are coupled together by means of a pivot 6 configured to allow rotary movement of the functional block 2 with respect to the functional block 4. The angle $\alpha_{LID}$ formed between the surface of the functional block 2 (corresponding to the display 2a) and the surface of the functional block 4 (corresponding to the keyboard 4a) is known as an opening angle or "lid angle". By convention, the angle $\alpha_{LID}$ is equal to 0 degrees when the surface of the functional block 4 is parallel to, and directly facing the surface of the functional block 2; and is equal to 360 degrees when the surface of the functional block 4 is parallel to the surface of the functional block 2 but oriented in the opposite direction.

The magnitude of the angle $\alpha_{LID}$ is typically used to control one or more operations of the computing device, such as to adapt or modify a user interface displayed by the display or screen 2a in order to improve the experience of using the portable computing device 1, e.g., to render the experience more user-friendly.

With the spread of portable devices such as tablets, smartphones and the like, there has been increasing use of accessories such as keyboards external to the portable device, which are operatively coupled thereto, for example incorporated in a cover of the portable device and connected to the portable device by means of a wireless connection. These covers are provided with means for supporting/holding the portable device so as to render use thereof more experience similar to that of using a notebook of the type illustrated in FIG. 1. Again in this case, similarly to what has been described with reference to FIG. 1, it is useful to measure the angle $\alpha_{LID}$ formed between the display of the portable device and the upper surface of the accessory considered, for example the keyboard. It is thus possible to adapt or personalize the user interface or particular configurations of the notebook 1 (or of the portable device used) on the basis of the value of the angle $\alpha_{LID}$, thus improving the experience of using the portable device and offering new possibilities for its use.

Known methods for detecting the angle $\alpha_{LID}$ envision the use of an accelerometer mounted in the functional block 2 and an accelerometer mounted in the functional block 4. These accelerometers supply data representing the direction of the force of gravity with respect to a system of coordinates centered on said accelerometer, thus making it possible to identify a position of the functional block 2 with respect to the functional block 4. However, the known methods, based exclusively on the information provided by gravity, may have difficulty providing indications that are useful for all orientations and spatial arrangements of the portable device, and are also subject to environmental vibrational stimuli that can render the measurement inaccurate or erroneous.

BRIEF SUMMARY

An embodiment facilitates providing a computing system and a corresponding method without the disadvantages of the known art.

In an embodiment, a computing system comprises: a first hardware element having a first accelerometer and a first gyroscope; a second hardware element having a second accelerometer and a second gyroscope, wherein the first hardware element is moveable with respect to the second hardware element and, in operation, the first accelerometer, the second accelerometer, the first gyroscope and the second gyroscope generate respective measurement signals; and processing circuitry communicatively coupled to the first and second hardware elements and which, in operation: recursively generates a result signal indicative of a relative orientation of the first and second hardware elements as a function of the measurement signals generated by the first accelerometer, the second accelerometer, the first gyroscope and the second gyroscope; and generates one or more control signals to control one or more of the first hardware element and the second hardware element as a function of the result signal. In an embodiment, the processing circuitry, in operation, generates the result signal as a function of a weight indicative of a reliability of the measurement signals as being indicative of the relative orientation of the first and second hardware elements. In an embodiment, the processing circuitry, in operation, generates a first intermediate signal indicative of an angle between the first hardware element and the second hardware element as a function of measurement signals generated by the first and second accelerometers; generates a second intermediate signal indicative of said angle as a function of measurement signals generated by the first and second gyroscopes; and generates the result signal as a weighted sum of the first intermediate signal and the second intermediate signal. In an embodiment, the first hardware element includes a first user-interface and the second hardware element includes a second user interface. In an embodiment, the first user-interface and the second user-interface define first and second surfaces respectively which face each other directly in a first operating condition of the computing system, and in which: the first accelerometer is a triaxial accelerometer having first, second and third detection axes, configured to detect an acceleration of the first hardware element with respect to the second hardware element outside a horizontal plane parallel to the first and to the second surface in the first operating condition, said signals generated by the first accelerometer including acceleration values along said first, second and third detection axes of the first accelerometer, the second accelerometer is a triaxial accelerometer having first, second and third detection axes, configured to detect an acceleration of the first hardware element with respect to the second hardware element outside the horizontal plane, said signals generated by the second accelerometer including acceleration values along said first, second and third detection axes of the second accelerometer. In an embodiment, in a second operating condition of the computing system, the first surface is at a right angle to the second surface, and in which: in the first operating condition, only the first detection axis of the first accelerometer is subject to gravitational acceleration and, in the second operating condition, only the second detection axis of the first accelerometer is subject to gravitational acceleration, said processing circuitry, in operation, adjusts a weighting assigned to the first intermediate signal and a weighting assigned to the second intermediate signal as a function of an acceleration value detected along the third detection axis of the first accelerometer in a third operating condition in which the third detection axis of the first accelerometer is subject to gravitational acceleration. In an embodiment, in the first operating condition, the first detection axis of the first accelerometer is parallel to a gravitational acceleration vector, while the second and the third detection axis of the first accelerometer are perpendicular to the gravitational acceleration vector; and in the second operating condition, the second detection axis of the first accelerometer is parallel to the gravitational acceleration vector, while the first and the third detection axis of the first accelerometer are perpendicular to the gravitational acceleration vector. In an embodiment, the generation of the first intermediate signal includes performing the operation:

$$atan2\left(\frac{A_{z1}A_{y2} - A_{y1}A_{z2}}{A_{z1}A_{z2} - A_{y1}A_{y2}}\right) + \pi$$

where $A_{z1}$ is an acceleration value detected by the first accelerometer along the first detection axis of the first accelerometer, $A_{y1}$ is an acceleration value detected by the first accelerometer along the second detection axis of the first accelerometer, $A_{z2}$ is an acceleration value detected by the second accelerometer along the first detection axis of the second accelerometer, and $A_{y2}$ is an acceleration value detected by the second accelerometer along the second detection axis of the second accelerometer. In an embodiment, generating the result signal includes applying low-pass filtering to the first intermediate signal and high-pass filtering to the second intermediate signal. In an embodiment, generating the result signal includes applying:

$$k \cdot \alpha_{LID\_ACC} + (1-k) \cdot \alpha_{LID\_GYR}$$

where $\alpha_{LID\_ACC}$ is the first intermediate signal, $\alpha_{LID\_GYR}$ is the second intermediate signal, and k is a weighting factor of greater than zero and less than one. In an embodiment, in a first operating condition, the third detection axis of the first accelerometer forms an angle different to 90° with respect to a gravitational acceleration vector, and said weighting factor k has a value which is a function of an angle between the third detection axis of the first accelerometer and the gravitational acceleration vector. In an embodiment, generating the result signal as a weighted sum of the first intermediate signal and the second intermediate signal includes implementing a recursive complementary filter defined by:

$$V\alpha_{LID}(t) = k \cdot V\alpha_{LID\_ACC}(t) + (1-k) \cdot (\Delta_\alpha + V\alpha_{LID}(t-1))$$

where:
$V\alpha_{LID}(t)$ is the current value of the angle ($\alpha_{LID}$);
k is a weight indicative of a reliability of said measurement signals indicative of the relative orientation of the first and the second hardware elements;
$V\alpha_{LID\_ACC}(t)$ is the first intermediate value;
$\Delta_a$ is an angular variation obtained as a function of a first value ($\omega_1$) and a second value ($\omega_2$) of angular rate measured by the first and by the second gyroscopes, respectively; and
$V\alpha_{LID}(t-1)$ is a previous value of the angle.

In an embodiment, the processing circuitry comprises a complementary filter, which, in operation, applies low-pass filtering to the first intermediate signal and high-pass filtering to the second intermediate signal In an embodiment, the signals generated by the first and second gyroscopes include a first and a second angular rate signal respectively, and the operation of calculating the second intermediate signal includes adding an angular change obtained as a function of the first and of the second angular rate signals to the result signal. In an embodiment, said angular change ($\Delta_\alpha$) at a current time instant (t) is given by:

$$\Delta_\alpha = (\omega_{x1} - \omega_{x2}) \cdot dt$$

where $\omega_1$ is a first angular rate value, $\omega_2$ is a second angular rate value, and dt corresponds to an acquisition or sampling time of the signals generated by the first and by the second gyroscopes. In an embodiment, the one or more control signals adjust an operating or functional characteristics of the first user interface. In an embodiment, the first user interface is one of a screen, a keyboard, a tablet, a smartphone.

In an embodiment, a device comprises: one or more memories; and processing circuitry communicatively coupled to the one or more memories, wherein the processing circuitry, in operation: recursively generates a result signal indicative of a relative position of first and second hardware elements of a computing system as a function of a first accelerometer signal associated with the first hardware element, a second accelerometer signal associated with the second hardware element, a first gyroscope signal associated with the first hardware element and a second gyroscope signal associated with the second hardware element; and generates one or more control signals to control one or more of the first hardware element and the second hardware element as a function of the result signal. In an embodiment, the processing circuitry, in operation, generates the result signal as a function of a weight indicative of a reliability of the first accelerometer signal, the second accelerometer signal, the first gyroscope signal and the second gyroscope signal. In an embodiment, the processing circuitry, in operation, generates a first intermediate signal indicative of an angle between the first hardware element and the second hardware element as a function of the first and second accelerometer signals; generates a second intermediate signal indicative of said angle as a function of the first and second gyroscope signals; and generates the result signal as a weighted sum of the first intermediate signal and the second intermediate signal. In an embodiment, generating the result signal includes applying low-pass filtering to the first intermediate signal and high-pass filtering to the second intermediate signal. In an embodiment, generating the result signal includes applying:

$$k \cdot \alpha_{LID\_ACC} + (1-k) \cdot \alpha_{LID\_GYR}$$

where $\alpha_{LID\_ACC}$ is the first intermediate signal, $\alpha_{LID\_GYR}$ is the second intermediate signal, and k is a weighting factor. In an embodiment, the one or more control signals adjust an operating or functional characteristics of a user interface. In an embodiment, the device comprises: the first hardware element, wherein the first hardware element includes the first accelerometer and the first gyroscope; and the second hardware element, wherein the second hardware element includes the second accelerometer and the second gyroscope.

In an embodiment, a method comprises: recursively generating, using signal processing circuitry, a result signal indicative of a relative position of first and second hardware elements of a computing system as a function of a first accelerometer signal associated with the first hardware element, a second accelerometer signal associated with the second hardware element, a first gyroscope signal associated with the first hardware element and a second gyroscope signal associated with the second hardware element; and generating one or more control signals to control one or more of the first hardware element and the second hardware element as a function of the result signal. In an embodiment, the recursively generating the result signal comprises: generating a first intermediate signal indicative of an angle between the first hardware element and the second hardware element based on the first accelerometer signal associated with the first hardware element and the second accelerometer signal associated with the second hardware element; generating a second intermediate signal indicative of the angle based on the first gyroscope signal associated with the first hardware element and the second gyroscope signal associated with the second hardware element; and generating the result signal as a weighted sum of the first intermediate signal and the second intermediate signal. In an embodiment, generating the result signal includes applying low-pass filtering to the first intermediate signal and high-pass filtering to the second intermediate signal.

In an embodiment, a non-transitory computer-readable medium has contents which cause processing circuitry of a device to perform a method. The method comprises: recursively generating a result signal indicative of a relative position of first and second hardware elements of the device as a function of a first accelerometer signal associated with the first hardware element, a second accelerometer signal associated with the second hardware element, a first gyroscope signal associated with the first hardware element and a second gyroscope signal associated with the second hardware element; and generating one or more control signals to control one or more of the first hardware element and the second hardware element as a function of the result signal. In an embodiment, the recursively generating the result signal comprises: generating a first intermediate signal indicative of an angle between the first hardware element and the second hardware element based on the first accelerometer signal associated with the first hardware element and the second accelerometer signal associated with the second hardware element; generating a second intermediate signal indicative of the angle based on the first gyroscope signal associated with the first hardware element and the second gyroscope signal associated with the second hardware element; and generating the result signal as a weighted sum of the first intermediate signal and the second intermediate signal. In an embodiment, the contents comprise instructions which, when executed by the processing circuitry of the device, cause the processing circuitry to perform the method.

In an embodiment, a computing system comprises: a first hardware element having a first accelerometer and a first gyroscope; a second hardware element having a second accelerometer and a second gyroscope, wherein the first hardware element is moveable with respect to the second hardware element; and processing circuitry communicatively coupled to the first and second hardware elements and which, in operation: generates a first intermediate signal indicative of an angle between the first hardware element and the second hardware element based on signals generated by the first and second accelerometers; generates a second intermediate signal indicative of said angle based on signals generated by the first and second gyroscopes; generates a result signal indicative of said angle as a weighted sum of the first intermediate signal and the second intermediate signal; and generates one or more control signals to control one or more of the first hardware element and the second hardware element based on the result signal. In an embodiment, the first hardware element includes a first user-interface and the second hardware element includes a second user interface. In an embodiment, the first user-interface and the second user-interface define first and second surfaces respectively which face each other directly in a first operating condition of the computing system, and in which: the first accelerometer is a triaxial accelerometer having first, second and third detection axes, configured to detect an acceleration of the first hardware element with respect to the second hardware element outside a horizontal plane parallel to the first and to the second surface in the first operating condition, said signals generated by the first accelerometer including acceleration values along said first, second and third detection axes of the first accelerometer, the second accelerometer is a triaxial accelerometer having first, second and third detection axes, configured to detect an acceleration of the first hardware element with respect to the second hardware element outside the horizontal plane, said signals generated by the second accelerometer including acceleration values along said first, second and third detection axes of the second accelerometer. In an embodiment, in a second operating condition of the computing system, the first surface is at a right angle to the second surface, and in which: in the first operating condition, only the first detection axis of the first accelerometer is subject to gravitational acceleration and, in the second operating condition, only the second detection axis of the first accelerometer is subject to gravitational acceleration, said processing circuitry, in operation, adjusts a weighting assigned to the first intermediate signal and a weighting assigned to the second intermediate signal based on an acceleration value detected along the third detection axis of the first accelerometer in a third operating condition in which the third detection axis of the first accelerometer is subject to gravitational acceleration. In an embodiment, in the first operating condition, the first detection axis of the first accelerometer is parallel to a gravitational acceleration vector, while the second and the third detection axis of the first accelerometer are perpendicular to the gravitational acceleration vector; and in the second operating condition, the second detection axis of the first accelerometer is parallel to the gravitational acceleration vector, while the first and the third detection axis of the first accelerometer are perpendicular to the gravitational acceleration vector. In an embodiment, wherein the generation of the first intermediate signal includes performing the operation:

$$a\tan 2\left(\frac{A_{z1}A_{y2} - A_{y1}A_{z2}}{A_{z1}A_{z2} - A_{y1}A_{y2}}\right) + \pi \quad (1)$$

where $A_{z1}$ is an acceleration value detected by the first accelerometer along the first detection axis of the first accelerometer, $A_{y1}$ is an acceleration value detected by the first accelerometer along the second detection axis of the first accelerometer, $A_{z2}$ is an acceleration value detected by the second accelerometer along the first detection axis of the second accelerometer, and $A_{y2}$ is an acceleration value detected by the second accelerometer along the second detection axis of the second accelerometer. In an embodiment, generating the result signal includes applying low-pass filtering to the first intermediate signal and high-pass filtering to the second intermediate signal. In an embodiment, generating the result signal includes applying:

$$k \cdot \alpha_{LID\_ACC} + (1-k) \cdot \alpha_{LID\_GYR}$$

where $\alpha_{LID\_ACC}$ is the first intermediate signal, $\alpha_{LID\_GYR}$ is the second intermediate signal, and k is a weighting factor of greater than zero and less than one. In an embodiment, a value of the weighting factor k is less than 0.2. In an embodiment, in a third operating condition, the third detection axis of the first accelerometer forms an angle different to 90° with respect to a gravitational acceleration vector, and said weighting factor k has a value which is a function of an angle between the third detection axis of the first accelerometer and the gravitational acceleration vector. In an embodiment, the signals generated by the first and second gyroscopes include a first and a second angular rate signal respectively, the operation of calculating the second intermediate signal includes adding an angular change obtained as a function of the first and of the second angular rate signals to the result signal. In an embodiment, said angular change ($\Delta_\alpha$) at a current time instant (t) is given by:

$$\Delta_\alpha = (\omega_{x1} - \omega_{x2}) \cdot dt$$

where $\omega_1$ is a first angular rate value, $\omega_2$ is a second angular rate value, and dt corresponds to an acquisition or sampling time of the signals generated by the first and by the second gyroscopes. In an embodiment, the one or more control signals adjust an operating or functional characteristics of the first user interface. In an embodiment, the first user interface is one of a screen, a keyboard, a tablet, a smartphone.

In an embodiment, a device comprises: one or more memories; and processing circuitry communicatively coupled to the one or more memories, wherein the processing circuitry, in operation: generates a first intermediate signal indicative of an angle between a first hardware element and a second hardware element based on an accelerometer signal associated with the first hardware element and an accelerometer signal associated with the second hardware element; generates a second intermediate signal indicative of the angle based on a first gyroscope signal associated with the first hardware element and a second gyroscope signal associated with the second hardware element; generates a result signal indicative of the angle as a weighted sum of the first intermediate signal and the second intermediate signal; and generates one or more control signals to control one or more of the first hardware element and the second hardware element based on the result signal. In an embodiment, the device comprises the first hardware element, wherein the first hardware element includes the first accelerometer and the first gyroscope. In an embodiment, the device comprises the second hardware element, wherein the second hardware element includes the second accelerometer and the second gyroscope. In an embodiment, generating the result signal includes applying low-pass filtering to the first intermediate signal and high-pass filtering to the second intermediate signal. In an embodiment, the generating the result signal includes applying:

$$k \cdot \alpha_{LID\_ACC} + (1-k) \cdot \alpha_{LID\_GYR}$$

where $\alpha_{LID\_ACC}$ is the first intermediate signal, $\alpha_{LID\_GYR}$ is the second intermediate signal, and k is a weighting factor of greater than zero and less than one.

In an embodiment, a method comprises: generating, using processing circuitry, a first intermediate signal indicative of an angle between a first hardware element and a second hardware element based on an accelerometer signal associated with the first hardware element and an accelerometer signal associated with the second hardware element; generating, using the processing circuitry, a second intermediate signal indicative of the angle based on a first gyroscope signal associated with the first hardware element and a second gyroscope signal associated with the second hardware element; generating, using the processing circuitry, a result signal indicative of the angle as a weighted sum of the first intermediate signal and the second intermediate signal; and generating, using the processing circuitry, one or more control signals to control one or more of the first hardware element and the second hardware element based on the result signal. In an embodiment, generating the result signal includes applying low-pass filtering to the first intermediate signal and high-pass filtering to the second intermediate signal. In an embodiment, the generating the result signal includes applying:

$$k \cdot \alpha_{LID\_ACC} + (1-k) \cdot \alpha_{LID\_GYR}$$

where $\alpha_{LID\_ACC}$ is the first intermediate signal, $\alpha_{LID\_GYR}$ is the second intermediate signal, and k is a weighting factor of greater than zero and less than one.

In an embodiment, a non-transitory computer-readable medium's contents cause processing circuitry of a device to perform a method, the method comprising: generating a first intermediate signal indicative of an angle between a first hardware element and a second hardware element based on an accelerometer signal associated with the first hardware element and an accelerometer signal associated with the second hardware element; generating a second intermediate signal indicative of the angle based on a first gyroscope signal associated with the first hardware element and a second gyroscope signal associated with the second hardware element; generating a result signal indicative of the angle as a weighted sum of the first intermediate signal and the second intermediate signal; and generating one or more control signals to control one or more of the first hardware element and the second hardware element based on the result signal. In an embodiment, the contents comprise instructions which, when executed by the processing circuitry of the device, cause the processing circuitry to perform the method. In an embodiment, the generating the result signal includes applying:

$$k \cdot \alpha_{LID\_ACC} + (1-k) \cdot \alpha_{LID\_GYR}$$

where $\alpha_{LID\_ACC}$ is the first intermediate signal, $\alpha_{LID\_GYR}$ is the second intermediate signal, and k is a weighting factor of greater than zero and less than one.

BRIEF DESCRIPTION OF THE SEVERAL VIEWS OF THE DRAWINGS

For a better understanding of the present disclosure, embodiments will now be described purely by way of non-limiting example with reference to the appended drawings, in which.

DETAILED DESCRIPTION

The document US20150/130725 describes a dual-display system in which an opening angle between the two displays is calculated by using measurements of accelerometers, gyroscopes, and a reference sensor of geomagnetic field. According to the disclosure of US2015/0130725, the absolute position in the space of each display is calculated by using the measurements made by the accelerometers, the gyroscopes, and the geomagnetic sensor, and, by means of generic data-fusion algorithms, said opening angle is then calculated. This solution, envisaging the use of a geomagnetic sensor, is subject to possible errors and faults caused by unforeseeable magnetic interference and by the fact that the magnetic conditions themselves change according to the relative position of the two displays. The value of opening angle obtained by means of the system disclosed in US2015/130725 is consequently not necessarily reliable in all operating conditions.

Figure 2:
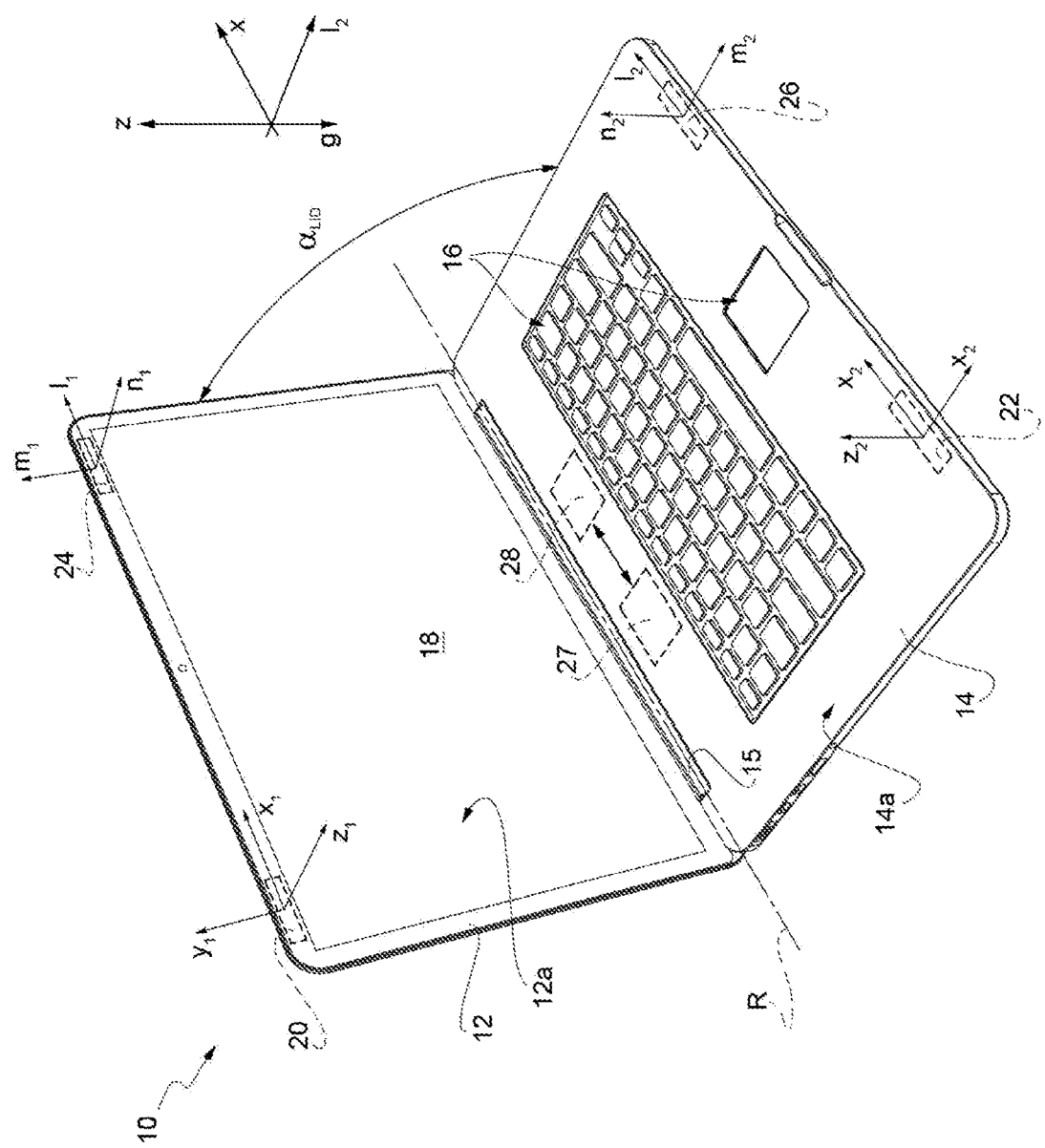
FIG. 2 shows a perspective view of a computing device, in particular a notebook, provided with accelerometers, gyroscopes and a calculating unit, configured to calculate an angle of opening for the display with respect to the keyboard, in accordance with an embodiment of the present disclosure.

With reference to FIG. 2, according to one aspect of the present disclosure, a computing device 10 is shown in a triaxial reference system X, Y, Z in which the vector g represents the gravitational acceleration vector acting parallel to the axis Z.

Figure 1:
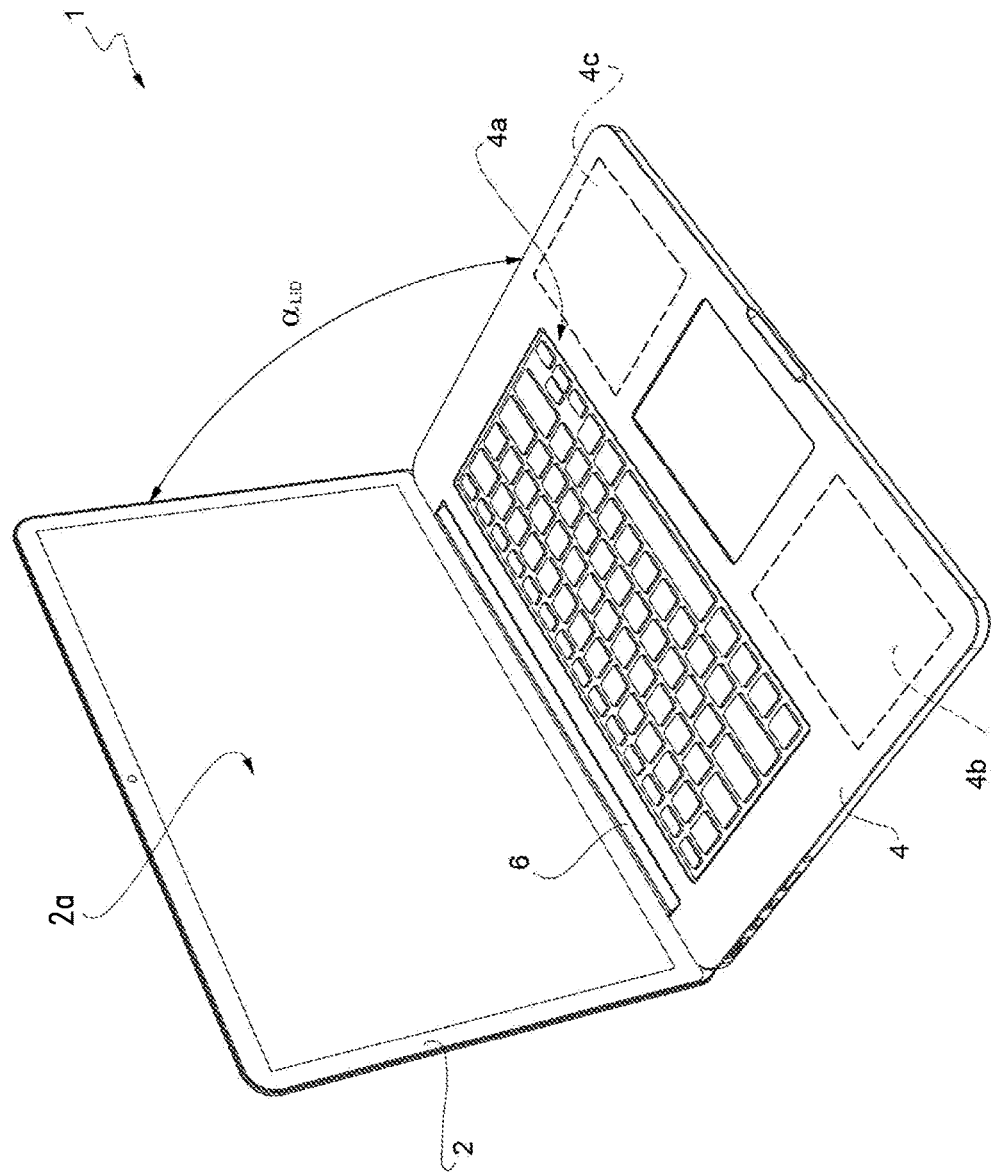
FIG. 1 shows a computing device, in particular a notebook, provided with accelerometers and a calculating unit, configured to calculate an opening angle for the screen with respect to the keyboard.

The computing device 10, which is structurally similar to the device 1 of FIG. 1, is of a portable type (in particular a notebook) and is here shown in an operating condition where the device is open. The computing device 10 includes a lid portion 12 and a base portion 14, mechanically coupled together by means of a hinge 15 that allows the lid portion 12 to rotate with respect to the base portion 14, forming a rotational constraint about an axis R parallel to the axis X. The base portion 14 comprises a data-input device (or several data-input devices) 16 (e.g., keyboard and/or trackpad) extending over a surface 14a of the base portion 14. The lid portion 12 comprises a display region 18 (e.g., a screen or monitor) extending over a surface 12a of the lid portion 12. The lid portion 12 houses (e.g., incorporates within it) a first inertial sensor 20, for example a first accelerometer, configured to detect and/or calculate acceleration values for the lid portion 12 along corresponding detection axes $x_1$, $y_1$, $z_1$; and the base portion 14 houses (e.g., incorporates within it) a second inertial sensor 22, for example a second accelerometer, configured to detect and/or calculate acceleration values for the base portion 14 along corresponding detection axes $x_2$, $y_2$, $z_2$. In general, the first and the second accelerometers 20, 22 are adopted to detect a movement of the computing device 10 by measuring an acceleration. The first and the second accelerometers 20, 22 are, for example, accelerometers manufactured using MEMS technology.

The first and the second accelerometers 20, 22 are therefore capable of detecting variations with respect to a state of rest of the computing device 10, or vibrations to which the computing device 10 or the environment in which the computing device 10 lies, for example caused by movement of the user of the computing device 10 (walking) or of a means of transport in which the computing device 10 is located. Other movements which the first and the second accelerometers 20, 22 may detect include rotations imparted by the user to the computing device 10, and a change in the mutual position between the lid portion 12 and the base portion 14 (for example due to opening and closing of the lid portion which rotates about the axis R through the effect of the hinge 15). In this latter case, in particular, the first and the second accelerometers 20, 22 are used to determine the opening angle $\alpha_{LID}$ between the detection axis $y_1$ and the axis $y_2$ of the respective first and second accelerometers 20, 22. The opening angle $\alpha_{LID}$ is therefore correlated with the angle existing between the surface 12a of the lid portion 12 and the surface 14a of the base portion 14, and is also known as the lid angle. In use, it is possible to correlate the value of the opening angle $\alpha_{LID}$ with a mode of use of the computing device 10 (e.g., an opening angle $\alpha_{LID}$ having a value of approximately 130 degrees suggests use in laptop mode, while an opening angle $\alpha_{LID}$ having a value of 360 degrees suggests use in tablet mode). It is therefore possible to adjust the graphic interface displayed on the screen 18 to the type of operating mode, or to adjust other operating parameters of the computing device 10, e.g., to enable the touch screen functionality when use in tablet mode is detected, or to vary yet other parameters such as the switching on/switching off of the screen or of the computing device 10 if the value of the opening angle is greater than/less than a certain threshold.

According to one aspect of the present disclosure, the lid portion 12 also houses (e.g., incorporates within it) a third inertial sensor 24, for example a first gyroscope, configured to detect and/or calculate an orientation and rotation of the lid portion 12 along and around detection axes $l_1$, $m_1$, $n_1$ which are parallel to the detection axes $x_1$, $y_1$, $z_1$, respectively, of the first accelerometer 20; and the base portion 14 also houses (e.g., incorporates within it) a fourth inertial sensor 26, for example a second gyroscope, configured to detect and/or calculate an orientation and rotation of the base portion 14 along and around detection axes $l_2$, $m_2$, $n_2$ which are parallel to the detection axes $x_2$, $y_2$, $z_2$, respectively, of the second accelerometer 22.

It should be noted that, in the embodiment of the computing device 10 considered here, the axis R of the hinge 15 is always parallel to the detection axes $x_1$, $x_2$, $l_1$, $l_2$ in any operating condition (with the lid portion 12 closed or open) and for any orientation of the device 10 in the triaxial system X, Y, Z.

The computing device 10 also comprises a calculating unit 27 (e.g., a processor, a processing core, processing circuitry), and a memory 28 which are connected together. The calculating unit 27 and/or the memory 28 are also operatively coupled to the first and to the second accelerometers 20, 22 and to the first and to the second gyroscopes 24, 26 to receive therefrom the respective operating signals generated as outputs (the acceleration/angular rate signals generated according to the operation of the accelerometers and of the gyroscopes, which are in themselves known). The signals received as an input by the calculating unit 27 may be processed, for example as described below with reference to FIG. 5.

Figure 3:
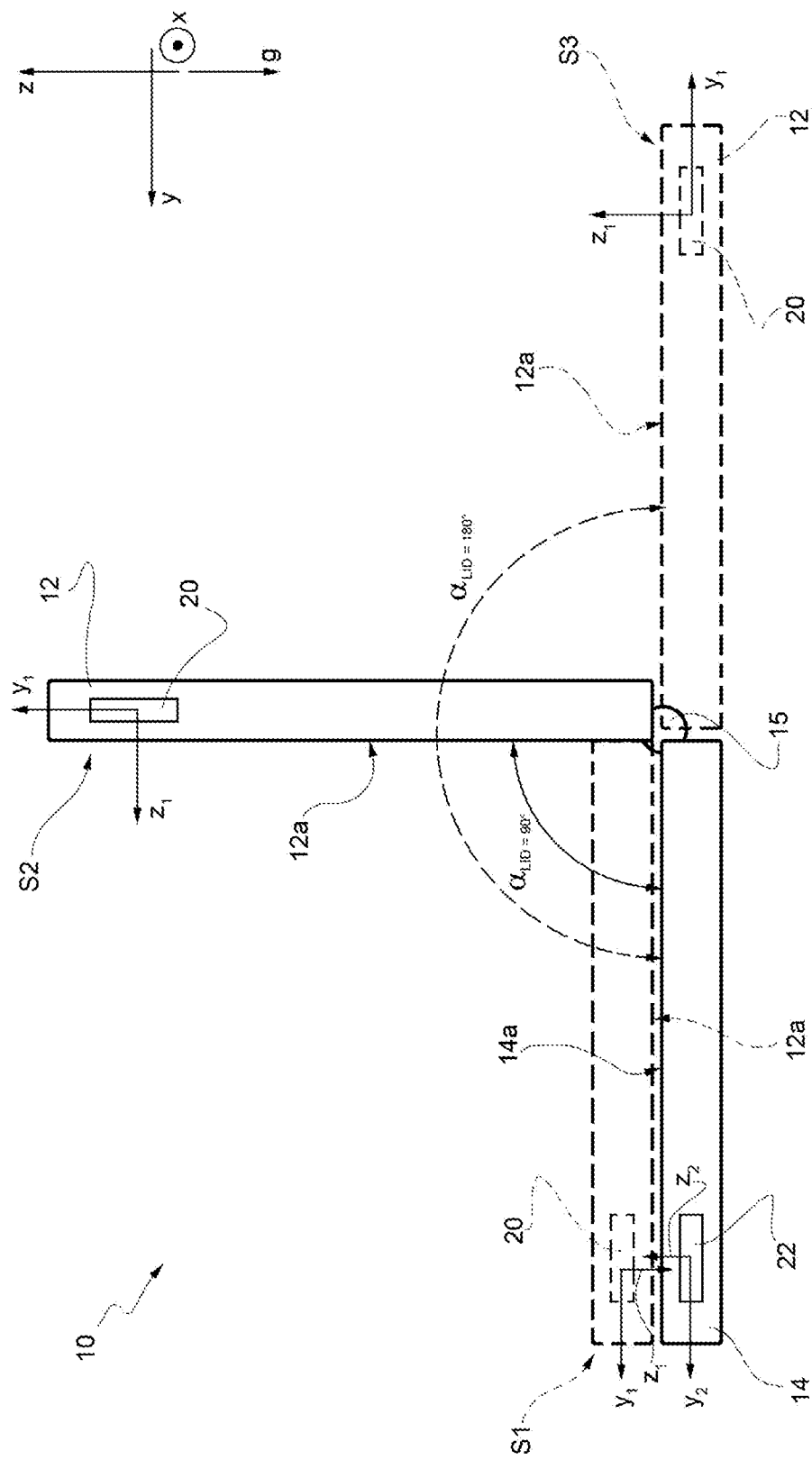
FIG. 3 shows a lateral view of the computing device in FIG. 2 in three alternative operating conditions.

FIG. 3 illustrates, in a lateral view in the YZ plane, the computing device 10 in FIG. 2, in which the lid portion 12 is shown in three possible operating conditions S1-S3: the lid portion 12 closed on the base portion 14, defining an angle $\alpha_{LID}$ having a zero value (S1); the lid portion 12 defining an angle $\alpha_{LID}$ equal to 90 degrees with respect to the base portion 14 (S2); and the lid portion 12 defining an angle $\alpha_{LID}$ equal to 180 degrees with respect to the base portion 14 (S3).

In the operating conditions S1-S3, the angle $\alpha_{LID}$ is the relative angle between the detection axis $y_1$ and the detection axis $y_2$ of the accelerometers 20 and 22, and because it may be assumed that these detection axes $y_1$, $y_2$ are parallel to the surfaces 12a, 14a of the lid portion 12 and of the base portion 14, respectively, the angle $\alpha_{LID}$ may also be treated as the relative angle between the surfaces 12a, 14a of the lid portion 12 and of the base portion 14. By determining the value of the angle $\alpha_{LID}$, it is possible to determine the opening angle, or lid angle, of the lid portion 12 with respect to the base portion 14. The same angular quantity can be defined between the axes $z_1$ and $z_2$, which are normal to the surfaces.

On changing from operating condition S1 to operating condition S2 (or similarly from operating condition S2 to operating condition S3), the first accelerometer 20 detects a change in the component of the gravitational acceleration g along the axes $z_1$ and $y_1$ and determines that the angle $\alpha_{LID}$ is increasing (vice versa when changing from condition S2 to condition S1, or from condition S3 to condition S2).

It may be noted in particular that, in the operating condition S1, the gravitational acceleration is provided exclusively by the value detected on the axis $z_1$ and in the operating condition S2 exclusively by the value detected on the axis $y_1$. In an intermediate condition, when, e.g., the angle $\alpha_{LID}$ is equal to 45 degrees, both the axes $y_1$ and $z_1$ provide the same acceleration value.

In the operating condition S1, the detection axis $z_1$ is parallel to the gravitational-acceleration vector g (the projection of the vector g onto the axis $z_1$ is a maximum); in the operating condition S2, the detection axis $z_1$ is orthogonal to the gravitational-acceleration vector g (the projection of the vector g onto the axis $z_1$ is a minimum); and in the operating condition S3, the detection axis $z_1$ is parallel to the gravitational-acceleration vector g, but in the opposite direction with respect to the operating condition S1 (the projection of the vector g onto the axis $z_1$ is a maximum, but of opposite value).

In order to calculate a value of the angle $\alpha_{LID}$, it is possible to make use of the projection of the gravitational-acceleration vector g onto the corresponding three detection axes of the first and of the second accelerometers 20, 22, bearing in mind the constraints due to the presence of the hinge 15. In this case, the value $V\alpha_{LID}$ of the angle $\alpha_{LID\_ACC}$ can be calculated as:

$$V\alpha_{LID\_ACC} = a\tan2\left(\frac{A_{z1}A_{y2} - A_{y1}A_{z2}}{A_{z1}A_{z2} - A_{y1}A_{y2}}\right) + \pi(\text{rad}) \quad (1)$$

where a tan 2 is the known trigonometric function, $A_{z1}$ is the acceleration value detected by the first accelerometer 20 along the detection axis $z_1$, $A_{y1}$ is the acceleration value detected by the first accelerometer 20 along the detection axis $y_1$, $A_{z2}$ is the acceleration value detected by the second accelerometer 22 along the detection axis $z_2$, and $A_{y2}$ is the acceleration value detected by the second accelerometer 22 along the detection axis $y_2$.

Formula (1) shows how the value of $V\alpha_{LID\_ACC}$ measured via the accelerometers 20, 22 represents a relative orientation (not an absolute orientation in space) between the lid portion 12 and the base portion 14.

Figure 4:
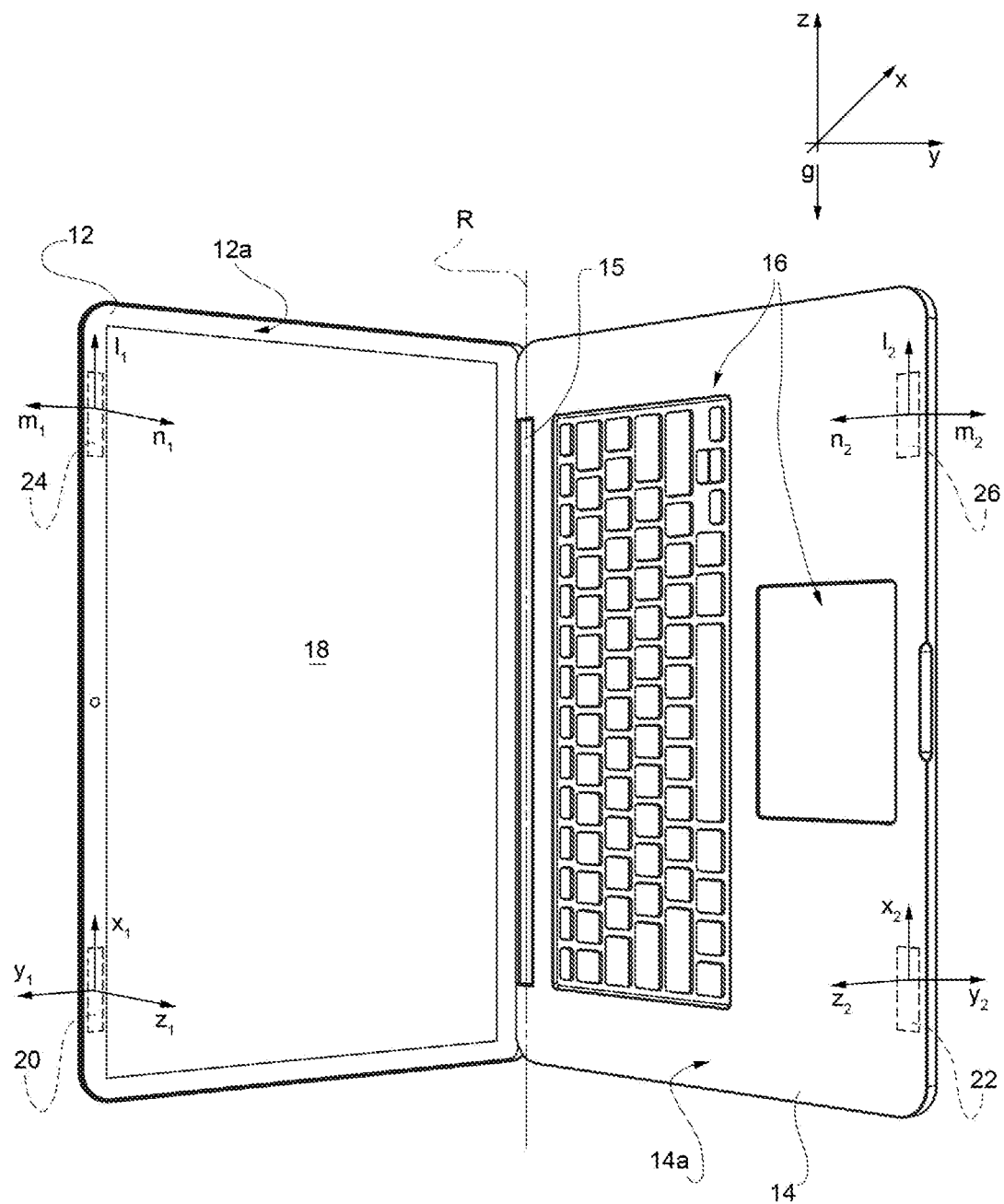
FIG. 4 shows a front view of the computing device in FIG. 2 in a further operating condition.

FIG. 4 shows one mode of use of the computing device 10 in which the computing device 10 is oriented with the axis R parallel to the axis Z, that is parallel to the gravity vector g. In this case, the change to the operating conditions S1-S2-S3 does not give rise to any variation in the acceleration component along the detection axes $z_1$, $z_2$ and $y_1$, $y_2$ of the first and of the second accelerometers 20, 22, because the component of the force of gravity along the axes indicated is always zero or substantially zero (the values $A_{z1}$, $A_{z2}$ and $A_{y1}$, $A_{y2}$ in formula (1) are approximately zero).

Intermediate orientation situations in which the axis R forms an angle of less than 90 degrees but greater than 0 degrees with the axis Z give rise to measurements of the angle $\alpha_{LID}$ which are increasingly erroneous the closer to the condition in FIG. 4 (axis R parallel to the axis Z).

That which is described with reference to FIG. 4 is also applicable, in an obvious manner per se, to the operating condition (not illustrated) in which the computing device 10 is oriented with the axis R parallel to the axis Z, but rotated through 180° with respect to the orientation shown in FIG. 4.

In order to overcome this disadvantage, according to one aspect of the present disclosure, the measurements obtained from the first and from the second accelerometers 20, 22 are fused or combined with the measurements obtained from the first and from the second gyroscopes 24, 26, for example assigning greater weighting to the measurements obtained from the first and from the second gyroscopes 24, 26 (and a correspondingly smaller weighting to the measurements obtained from the first and second accelerometers 20, 22), the greater the angle between the axis R and the axis Z (that is the closer to the condition in FIG. 4). In this way, it is also possible to filter the linear accelerations (that is, those not due to the force of gravity).

In an embodiment, the use of the gyroscopes facilitates addressing two problems: (i) use of the processing device like "a book"; and (ii) filtering of the linear accelerations (amongst which, in situations where the user is walking or with fast opening and closing of the base and lid portions).

The present applicant has, in fact, found that a system including just two accelerometers would not be able to overcome the two problems referred to above; as regards filtering of the linear accelerations, in actual fact, the estimate becomes reliable only when the device 1 is substantially stationary (the accelerometers detect only the acceleration of gravity and calculate the angle comprised between the two gravity vectors detected). In an embodiment, fusion or combining of the data of the accelerometers with the data of the gyroscopes is not carried out occasionally: as will be described more fully in what follows, a complementary filter is used (but other types of filtering, e.g., Kalman filtering, may also be used) and the accelerometric component is discarded or attenuated when the conditions presented above in points (i) and (ii) arise. In this way, not only are the deficiencies of the prior art overcome in the conditions of points (i) and (ii), but the system becomes more reactive (if only the accelerometers were used, it would be necessary to carry out a low-pass filtering, thus introducing latencies). In an embodiment, the accelerometric component has, specifically, the function of correcting the drift of the angle calculated with the gyroscopes.

In an embodiment, the gyroscopic contribution for the angle $\alpha_{LID}$ obtained by means of the measurements of the first and from the second gyroscopes 24, 26 acquired at a current time instant t is given by:

$$\Delta\alpha = (\omega_{x1} - \omega_{x2}) \cdot dt \quad (2)$$

where $\omega_{x1}$ is the angular rate measured by the first gyroscope 24, $\omega_{x2}$ is the angular rate measured by the second gyroscope 26. The value dt is the time that has elapsed between the instant t−1 and the instant t (sampling time or data-acquisition time of the output of the gyroscopes 24, 26, which in turn may depend upon the update time of the system, for example, corresponding to a rate of between 25 Hz and 200 Hz). For example, if sampling of the output of the gyroscopes is made at 100 Hz, the parameter dt is equal to 0.01 seconds.

Figure 5:
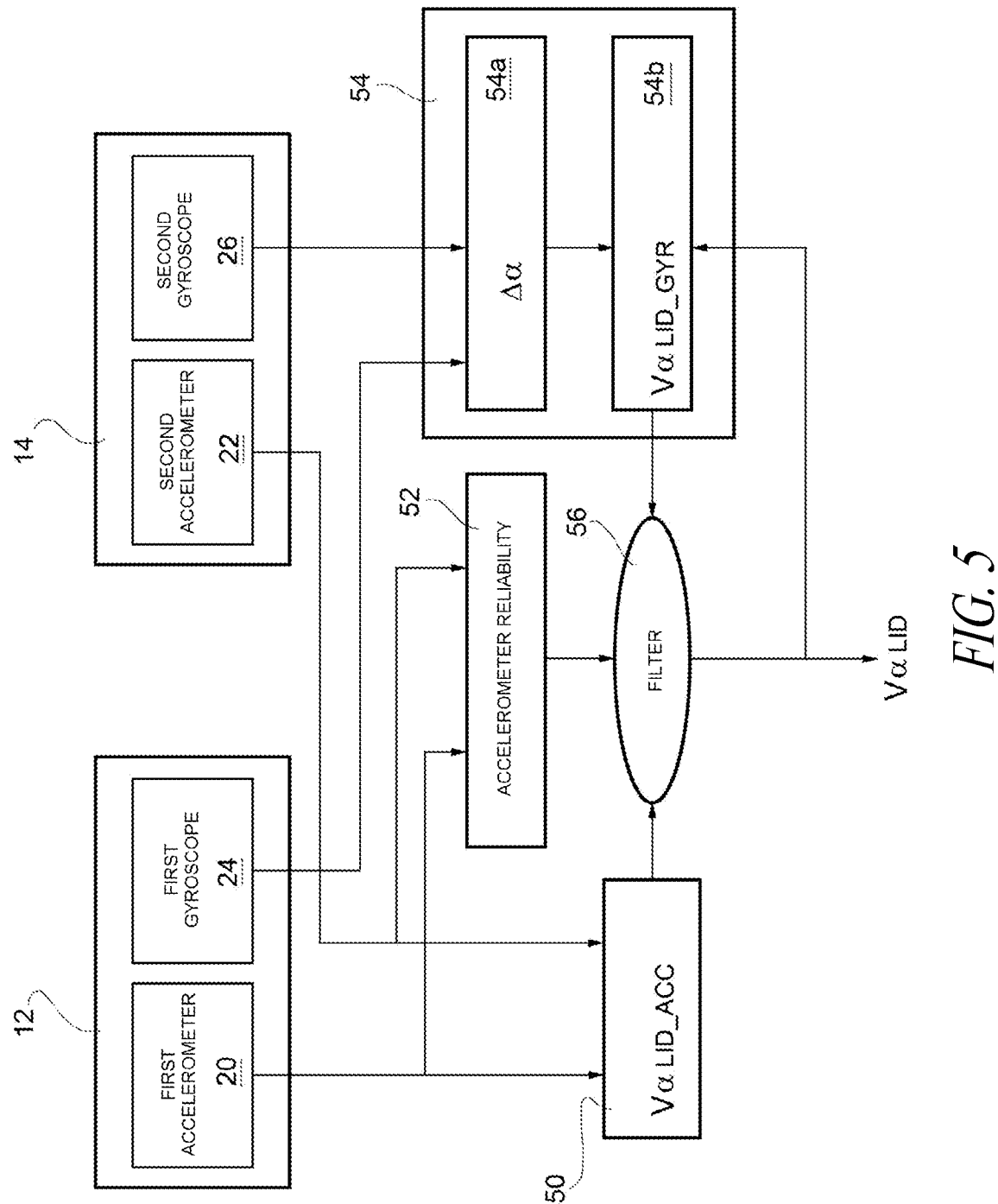
FIG. 5 shows diagrammatically functional blocks operated by the computing device in FIG. 2, in accordance with an embodiment of the present disclosure.

According to one aspect of the present disclosure, the calculating unit 27, with the possible support of the memory 28, is configured to, in operation, carry out the operations shown in FIG. 5 and described below. FIG. 5 diagrammatically illustrates functional blocks which may be implemented by the calculating unit 27 and memory 28 via software. It is evident that the functional blocks in FIG. 5 may be implemented in hardware, for example, in a manner which is in itself evident to those skilled in the art after reviewing the specification.

In a typical condition of use of the computing device 10, the base portion 14 of the computing device 10 lies on a horizontal plane XY, supported on an ideally flat surface. The detection axis $z_1$ of the first accelerometer 20 is perpendicular to the display 18 and provides information relative to the gravitational acceleration which varies as a function of the opening angle $\alpha_{LID}$. The second accelerometer 22 has its corresponding detection axis $z_2$, which in this operating condition is at right angles to the plane XY and to the surface 14a of the base portion 14.

Because the accelerometers 20, 22 are in a fixed position and the orientation of the detection axes is known, it is possible to calculate the value $V\alpha_{LID}$ of the angle $\alpha_{LID}$ as set out by formula (1).

When the detection axis $z_1$ is perfectly horizontal (that is parallel to the axis Y or to the plane XY), there is a condition in which the gravitational force is zero, and a signal $S_{z1}$ generated as an output from the first accelerometer 20 has a first value $S_{z1}'$; when the detection axis $z_1$ is perfectly vertical (that is parallel to the axis Z or to the plane XZ), there is a condition in which the gravitational force is a maximum along $z_1$ and a minimum along $x_1$ and $y_1$ and the signal S generated as an output from the first accelerometer 20 has a second value $S_{z1}''$. Intermediate situations generate respective output signals from the first accelerometer 20 having a value of between $S_{z1}'$ and $S_{z1}''$. However, when the computing device is inclined, forming an angle between the base portion 14 and the horizontal plane XY, and in particular when the former is arranged in the operating condition in FIG. 4, the effect of gravity along the detection axes $z_1$ and $z_2$ varies, in particular it decreases so as to become zero in the operating condition in FIG. 4. Thus, the calculation of the value $V\alpha_{LID}$ using formula (1), which only makes use of the output signals generated by the first and by the second accelerometers 20, 22, becomes increasingly less reliable the closer to the arrangement of the computing device approaches the operating condition of FIG. 4.

In order to facilitate overcoming this disadvantage (which may be caused by, for example, conditions (i) and (ii) discussed above), and to facilitate providing reliable results, in terms of calculating the angle $\alpha_{LID}$ in the possible conditions in which the computing device 10 is used, it is convenient to fuse the measurements from the accelerometers 20, 22 with the measurements from the gyroscopes 24, 26 (e.g., to use a weighted combination of the measurements from the accelerometers and the measurements from the gyroscopes, with the applied weights varying under various operating conditions).

Thus, with reference to FIG. 5, a first calculating block or circuit 50 implements formula (1). For this purpose, the first calculating block 50 receives as an input the acceleration values $A_{z1}$, $A_{y1}$, $A_{z2}$ and $A_{y2}$ from the first and from the second accelerometers 20, 22 and produces as an output a value $V\alpha_{LID\_ACC}$ of the opening angle $\alpha_{LID}$.

Again with reference to FIG. 5, a reliability block or circuit 52 receives gravitational acceleration values $A_{x1}$, $A_{x2}$ detected by the corresponding accelerometers 20, 22 along the detection axes $x_1$ and $x_2$ respectively as an input from the first and from the second accelerometers 20, 22. Under operating conditions in which the detection axes $x_1$ and $x_2$ are parallel to the horizontal plane XY, the acceleration values $A_{x1}$, $A_{x2}$ have a minimum value; vice versa, in the operating condition in FIG. 4, the acceleration values $A_{x1}$, $A_{x2}$ have a maximum value (the minimum and maximum values may depend on the type of inertial sensor used and are typically defined by its manufacturer). In one embodiment, it is thus possible to define a reliability threshold below which the calculation of the opening angle $\alpha_{LID}$ obtained using formula (1) is deemed to be correct or reliable, and above which the calculation of the opening angle $\alpha_{LID}$ obtained using formula (1) is not deemed to be correct or reliable. In the case of the computing device 10 of the type illustrated in FIGS. 2-4, in which the base portion 14 is integral with respect to the lid portion 12, an embodiment may evaluate reliability by analyzing only one of the acceleration values $A_{x1}$, $A_{x2}$. However, because the base portion 14 may in general not be integral with respect to the lid portion 12, an embodiment may evaluate both the acceleration values $A_{x1}$, $A_{x2}$. In this latter case, the calculation of the value $V\alpha_{LID\_ACC}$ of the opening angle $\alpha_{LID}$ obtained using formula (1) may be considered reliable only when both the acceleration values $A_{x1}$, $A_{x2}$ are below one or more determined thresholds. The reliability block 52 generates as an output a reliability value k which may be a binary value in the case of a single threshold (reliable/not reliable), or a value which is proportional to a degree of reliability found. In this latter case, it is possible to envisage a plurality of comparison thresholds for the acceleration values $A_{x1}$, $A_{x2}$ by varying the value k according to a step function, associating a different value of k with the passing of each envisaged threshold. The value of k will therefore vary between a minimum value and a maximum value as the acceleration values $A_{x1}$ and/or $A_{x2}$ increase; the minimum value of k may be the value zero while the maximum value of k may be selected between 0 and 1 depending on the considerations made below with reference to the block 56 (that is, in order to obtain adequate filtering of the vibrational components, or of the variations in the acceleration values $A_{x1}$ and/or $A_x$ which are not due to the force of gravity acting on the detection axes $x_1$ and $x_2$).

The reliability block 52 may implement further functionalities, such as for example detecting whether a user of the computing device 10 is walking, is moving, etc. In an embodiment, the reliability block 52 receives further parameters as an input for this purpose. It is possible for example to analyze some or all of the accelerometer axes, the accelerometer module, or it is also possible to calculate statistical indicators such as mean, variance, zero cross, peaks, maxima and minima, etc., for each axis and/or module. These parameters may also be taken into consideration for the gyroscope.

A second calculating block or circuit 54 is configured to receive the values of the angular rate $\omega_{x1}$, $\omega_{x2}$ detected by the first and by the second gyroscopes 24, 26 as an input and calculate the value of the opening angle $\alpha_{LID\_GYR}$, for example, on the basis of formula (3) discussed below.

For this purpose, the second calculating block 54 includes a sub-block or circuit 54a which is configured to calculate (at time instant t) a change $\Delta_\alpha$ in the value $V\alpha_{LID}$ of the opening angle $\alpha_{LID}$ with respect to the previously measured value (at the previous time instant t−1), for example using the following formula (2) discussed above.

In addition to this, the second calculating block 54 includes a further sub-block or circuit 54b configured to receive the value of the variation $\Delta_\alpha$ and the last value $V\alpha_{LID}(t-1)$ of the opening angle $\alpha_{LID}$ that was calculated and deemed to be reliable (e.g., generated as an output from the block 56 described below), and to recursively update that last value $V\alpha_{LID}(t-1)$ of the opening angle using the value of the variation $\Delta_\alpha$.

In an embodiment, the sub-block 54b thus implements the following formula (3):

$$V\alpha_{LID\_GYR}(t)=\Delta_\alpha+V\alpha_{LID}(t-1) \qquad (3)$$

A fusing block or circuit 56 has the function of generating a final value, which is deemed reliable, of the opening angle $\alpha_{LID}$ on the basis of the reliability value k calculated by the reliability block 52. The fusing block 56 receives as an input both of the values of the opening angle $\alpha_{LID}$ calculated according to formula (1) (that is using only the signals from the accelerometers 20, 22) and according to formula (3) (that is updating the last value $V\alpha_{LID}$ calculated using an angular variation obtained by means of measurements provided by the gyroscopes 24, 26).

For greater clarity, in the remainder of the description and in FIG. 5, the value for the opening angle $\alpha_{LID}$ calculated according to formula (1) is identified as $V\alpha_{LID\_ACC}$ and the value of the opening angle $\alpha_{LID}$ calculated according to formula (3) is identified as $V\alpha_{LID\_GYR}$.

The fusing block 56 implements a complementary filter which in an embodiment is defined by the following formula (4):

$$V\alpha_{LID}(t)=k\cdot V\alpha_{LID\_ACC}(t)+(1-k)\cdot V\alpha_{LID\_GYR}(t) \qquad (4)$$

The recursiveness of the complementary filter may be better appreciated by expanding, in formula (4), the term $V\alpha_{LID\_GYR}(t)$ with the relative formulas (2) and (3), thus obtaining:

$$V\alpha_{LID}(t)=k\cdot V\alpha_{LID\_ACC}(t)+(1-k)\cdot((\omega_{x1}-\omega_{x2})\cdot dt+V\alpha_{LID}(t-1)) \qquad (5)$$

On the first iteration of the method of calculating the value $V\alpha_{LID}(t)$ according to FIG. 5, as there may be no value $V\alpha_{LID}(t-1)$ relating to the preceding time instant t−1 as required by the sub-block 54b, in an embodiment $V\alpha_{LID}(t)$ may be set to $V\alpha_{LID\_ACC}(t)$ or a determined value (e.g., a default value) may for example be used.

By suitably setting the value of k, the complementary filter in formula (4) facilitates performing low-pass filtering on the component $V\alpha_{LID\_ACC}$ (thus filtering out the pulse signals caused by instantaneous vibrations or movements and detected by the accelerometers) and high-pass filtering of the component $V\alpha_{LID\_GYR}$. For example, the value of k may vary between k=0 in the situation where the measurements obtained from the accelerometers (output from the reliability block 52) are deemed to be unreliable, and k=0.1 in the case where they are fully reliable. Intermediate values of k between 0 and 0.1 may be used in the situation where the reliability block 52 provides for use of a plurality of thresholds, as described previously. The value of k may vary in embodiments from what has been previously indicated, for example between 0 and 0.5 in an embodiment, between 0 and 0.2 in an embodiment, for example to facilitate low-pass filtering in any event.

The applicant has found that in general the results from the calculation of the opening angle $\alpha_{LID}$ obtained using the gyroscopes 24, 26 are more accurate, in the short term, than those obtained using only the accelerometers 20, 22. This is due to the fact that the gyroscopes are not sensitive to high-frequency disturbances, as is, instead, the case for the accelerometers. However, errors associated with the calculation of the angle $\alpha_{LID}$ using the signals provided by the gyroscopes (e.g., integration errors, drift, etc.) may be summed over time giving rise to a cumulative error of significant amount. Thus, in an embodiment, the filtering operation performed by the fusing block 56 has a dual advantage of facilitating addressing both the drawbacks associated with calculating the opening angle using only accelerometers (already discussed above) and the drawbacks associated with calculating the opening angle using only gyroscopes (error accumulation and lack of knowledge of the initial opening angle at the moment when the system is switched on).

In an embodiment, the operations of calculation of the opening angle between the lid portion 12 and the base portion 14 do not require calculation of the absolute orientation of the lid portion 12 and of the base portion 14, unlike the solutions according to the prior art in which measurements are made of absolute orientation in space of respective functional blocks, with respect to which an opening angle is to be calculated.

In an embodiment, the use of the weight k, associated, as has been said, to an evaluation of reliability of the measurements made via the accelerometers, renders the methodology according to the present disclosure adaptive as a function of different operating conditions and of the service life of the accelerometers themselves.

In an embodiment, the use of recursive formulas, with a closed-loop system, renders moreover the system as a whole stable, fast, and with low computational load.

In general, in the context of the present disclosure, the angle $\alpha_{LID}$ is the angle between two elements or parts (which may be detached or separate from each other, or without the hinge 15) which go together to form an electronic device or system for the display of information. In an embodiment, these elements or parts are for example: a keyboard and a display; a dual display device; a keyboard and a tablet; a keyboard and a smartphone; a smartphone and a tablet; two smartphones; two tablets; or any other combination of keyboard, tablet, smartphone, and display.

In addition to this, it will be noted that the accelerometers 20 and 22 and the gyroscopes 24 and 26 may be implemented: (i) in modules which are separate from each other; (ii) in 6-axis inertial sensor modules (one module incorporating the accelerometer 20 and the gyroscope 24 and one module incorporating the accelerometer 22 and the gyroscope 26); (iii) in 9-axis inertial sensor modules (one module incorporating the accelerometer 20, the gyroscope 24 and a magnetometer, and one module incorporating the accelerometer 22 and the gyroscope 26 and a further magnetometer). In the latter case, the magnetometer, although present, may not be used for the purposes of the present disclosure in an embodiment.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computing system, comprising:
a first hardware element having a first accelerometer and a first gyroscope;
a second hardware element having a second accelerometer and a second gyroscope, wherein the first hardware element is moveable with respect to the second hardware element and, in operation, the first accelerometer, the second accelerometer, the first gyroscope and the second gyroscope generate respective measurement signals; and
processing circuitry communicatively coupled to the first and second hardware elements and which, in operation:
recursively generates a result signal indicative of a relative orientation of the first and second hardware elements as a function of the measurement signals generated by the first accelerometer, the second accelerometer, the first gyroscope and the second gyroscope; and
generates one or more control signals to control one or more of the first hardware element and the second hardware element as a function of the result signal,
wherein the processing circuitry, in operation, generates the result signal as a function of a weight indicative of a reliability of the measurement signals as being indicative of the relative orientation of the first and second hardware elements.

2. The computing system of claim 1 wherein the processing circuitry, in operation,
generates a first intermediate signal indicative of an angle between the first hardware element and the second hardware element as a function of measurement signals generated by the first and second accelerometers;
generates a second intermediate signal indicative of said angle as a function of measurement signals generated by the first and second gyroscopes; and
generates the result signal as a weighted sum of the first intermediate signal and the second intermediate signal.

3. The computing system of claim 1 wherein the first hardware element includes a first user-interface and the second hardware element includes a second user interface.

4. The computing system of claim 3 wherein the first user-interface and the second user-interface define first and second surfaces respectively which face each other directly in a first operating condition of the computing system, and in which:
the first accelerometer is a triaxial accelerometer having first, second and third detection axes, configured to detect an acceleration of the first hardware element with respect to the second hardware element outside a horizontal plane parallel to the first and to the second surface in the first operating condition, said signals generated by the first accelerometer including acceleration values along said first, second and third detection axes of the first accelerometer,
the second accelerometer is a triaxial accelerometer having first, second and third detection axes, configured to detect an acceleration of the first hardware element with respect to the second hardware element outside the horizontal plane, said signals generated by the second accelerometer including acceleration values along said first, second and third detection axes of the second accelerometer.

5. The computing system of claim 4 wherein in a second operating condition of the computing system, the first surface is at a right angle to the second surface, and in which:
in the first operating condition, only the first detection axis of the first accelerometer is subject to gravitational acceleration and, in the second operating condition, only the second detection axis of the first accelerometer is subject to gravitational acceleration,
said processing circuitry, in operation, adjusts a weighting assigned to the first intermediate signal and a weighting assigned to the second intermediate signal as a function of an acceleration value detected along the third detection axis of the first accelerometer in a third operating condition in which the third detection axis of the first accelerometer is subject to gravitational acceleration.

6. The computing system of claim 4 wherein,
in the first operating condition, the first detection axis of the first accelerometer is parallel to a gravitational acceleration vector, while the second and the third detection axis of the first accelerometer are perpendicular to the gravitational acceleration vector; and
in the second operating condition, the second detection axis of the first accelerometer is parallel to the gravitational acceleration vector, while the first and the third detection axis of the first accelerometer are perpendicular to the gravitational acceleration vector.

7. The computing system of claim 4 wherein the generation of the first intermediate signal includes performing the operation:

$$a\tan 2\left(\frac{A_{z1}A_{y2} - A_{y1}A_{z2}}{A_{z1}A_{z2} - A_{y1}A_{y2}}\right) + \pi$$

where $A_{z1}$ is an acceleration value detected by the first accelerometer along the first detection axis of the first accelerometer, $A_{y1}$ is an acceleration value detected by the first accelerometer along the second detection axis of the first accelerometer, $A_{z2}$ is an acceleration value detected by the second accelerometer along the first detection axis of the second accelerometer, and $A_{y2}$ is an acceleration value detected by the second accelerometer along the second detection axis of the second accelerometer.

8. The computing system of claim 2 wherein generating the result signal includes applying low-pass filtering to the first intermediate signal and high-pass filtering to the second intermediate signal.

9. The computing system of claim 8 wherein the generating the result signal includes applying:

$$k \cdot \alpha_{LID\_ACC} + (1-k) \cdot \alpha_{LID\_GYR}$$

where $\alpha_{LID\_ACC}$ is the first intermediate signal, $\alpha_{LID\_GYR}$ is the second intermediate signal, and k is a weighting factor of greater than zero and less than one.

10. The computing system of claim 9 wherein, in a first operating condition, the third detection axis of the first accelerometer forms an angle different to 90° with respect to a gravitational acceleration vector, and said weighting factor k has a value which is a function of an angle between the third detection axis of the first accelerometer and the gravitational acceleration vector.

11. The computing system of claim 2 wherein generating the result signal as a weighted sum of the first intermediate signal and the second intermediate signal includes implementing a recursive complementary filter defined by:

$$V\alpha_{LID}(t) = k \cdot V\alpha_{LID\_ACC}(t) + (1-k) \cdot (\Delta_\alpha + V\alpha_{LID}(t-1))$$

where:
$V\alpha_{LID}$ (t) is the current value of the angle ($\alpha_{LID}$);
k is a weight indicative of a reliability of said measurement signals indicative of the relative orientation of the first and the second hardware elements;
$V\alpha_{LID\_ACC}(t)$ is the first intermediate value;
$\Delta_\alpha$ is an angular variation obtained as a function of a first value ($\omega_1$) and a second value ($\omega_2$) of angular rate measured by the first and by the second gyroscopes, respectively; and
$V\alpha_{LID}(t-1)$ is a previous value of the angle.

12. The computing system of claim 8 wherein the processing circuitry comprises a complementary filter, which, in operation, applies low-pass filtering to the first intermediate signal and high-pass filtering to the second intermediate signal.

13. The computing system of claim 1 wherein the signals generated by the first and second gyroscopes include a first and a second angular rate signal respectively, and the operation of calculating the second intermediate signal includes adding an angular change obtained as a function of the first and of the second angular rate signals to the result signal.

14. The computing system of claim 13 wherein said angular change ($\Delta_\alpha$) at a current time instant (t) is given by:

$$\Delta_\alpha = (\omega_{x1} - \omega_{x2}) \cdot dt$$

where $\omega_1$ is a first angular rate value, $\omega_2$ is a second angular rate value, and dt corresponds to an acquisition or sampling time of the signals generated by the first and by the second gyroscopes.

15. The computing system of claim 3 wherein the one or more control signals adjust an operating or functional characteristics of the first user interface.

16. The computing system of claim 3 wherein the first user interface is one of a screen, a keyboard, a tablet, a smartphone.

17. A device, comprising:
a first hardware element having a first accelerometer and a first gyroscope;
a second hardware element having a second accelerometer and a second gyroscope;
one or more memories; and
processing circuitry communicatively coupled to the first hardware element, the second hardware element, and the one or more memories, wherein the processing circuitry, in operation:
recursively generates a result signal indicative of a relative position of the first and second hardware elements as a function of a first accelerometer signal associated with the first hardware element, a second accelerometer signal associated with the second hardware element, a first gyroscope signal associated with the first hardware element and a second gyroscope signal associated with the second hardware element; and
generates one or more control signals to control one or more of the first hardware element and the second hardware element as a function of the result signal,
wherein the processing circuitry, in operation, generates the result signal as a function of a weight indicative of a reliability of the first accelerometer signal, the second accelerometer signal, the first gyroscope signal and the second gyroscope signal.

18. The device of claim 17 wherein the processing circuitry, in operation,
generates a first intermediate signal indicative of an angle between the first hardware element and the second hardware element as a function of the first and second accelerometer signals;
generates a second intermediate signal indicative of said angle as a function of the first and second gyroscope signals; and
generates the result signal as a weighted sum of the first intermediate signal and the second intermediate signal.

19. The device of claim 18 wherein generating the result signal includes applying low-pass filtering to the first intermediate signal and high-pass filtering to the second intermediate signal.

20. The device of claim 18 wherein the generating the result signal includes applying:

$$k \cdot \alpha_{LID\_ACC} + (1-k) \cdot \alpha_{LID\_GYR}$$

where $\alpha_{LID\_ACC}$ is the first intermediate signal, $\alpha_{LID\_GYR}$ is the second intermediate signal, and k is a weighting factor.

21. The device of claim 17 wherein the one or more control signals adjust an operating or functional characteristics of a user interface.

22. A method, comprising:
generating, by a first hardware element of a computing system, a first accelerometer signal and a first gyroscope signal;
generating, by a second hardware element of the computing system, a second accelerometer signal and a second gyroscope signal;
recursively generating, using signal processing circuitry, a result signal indicative of a relative position of the first and second hardware elements of the computing system as a function of the first accelerometer signal associated with the first hardware element, the second accelerometer signal associated with the second hardware element, the first gyroscope signal associated with the first hardware element and the second gyroscope signal associated with the second hardware element; and
generating one or more control signals to control one or more of the first hardware element and the second hardware element as a function of the result signal, wherein the recursively generating the result signal comprises:
generating a first intermediate signal indicative of an angle between the first hardware element and the second hardware element based on the first accelerometer signal associated with the first hardware element and the second accelerometer signal associated with the second hardware element;
generating a second intermediate signal indicative of the angle based on the first gyroscope signal associated with the first hardware element and the second gyroscope signal associated with the second hardware element; and
generating the result signal as a weighted sum of the first intermediate signal and the second intermediate signal.

23. The method of claim 22 wherein generating the result signal includes applying low-pass filtering to the first intermediate signal and high-pass filtering to the second intermediate signal.

24. A non-transitory computer-readable medium having contents which cause processing circuitry of a device to perform a method, the method comprising:
receiving, from a first hardware element having a first accelerometer and a first gyroscope, a first accelerometer signal and a first gyroscope signal;
receiving from a second hardware element having a second accelerometer and a second gyroscope, a second accelerometer signal and a second gyroscope signal;
recursively generating a result signal indicative of a relative position of the first and second hardware elements of the device as a function of the first accelerometer signal associated with the first hardware element, the second accelerometer signal associated with the second hardware element, the first gyroscope signal associated with the first hardware element and the second gyroscope signal associated with the second hardware element; and
generating one or more control signals to control one or more of the first hardware element and the second hardware element as a function of the result signal,
wherein the recursively generating the result signal comprises:
generating a first intermediate signal indicative of an angle between the first hardware element and the second hardware element based on the first accelerometer signal associated with the first hardware element and the second accelerometer signal associated with the second hardware element;
generating a second intermediate signal indicative of the angle based on the first gyroscope signal associated with the first hardware element and the second gyroscope signal associated with the second hardware element; and
generating the result signal as a weighted sum of the first intermediate signal and the second intermediate signal.

25. The non-transitory computer-readable medium of claim 24 wherein the contents comprise instructions which, when executed by the processing circuitry of the device, cause the processing circuitry to perform the method.

26. The device of claim 17 wherein the first hardware element includes a first user-interface and the second hardware element includes a second user interface.

27. The device of claim 26 wherein the first user-interface and the second user-interface define first and second surfaces respectively which face each other directly in a first operating condition, and in which:
the first accelerometer is a triaxial accelerometer having first, second and third detection axes, configured to detect an acceleration of the first hardware element with respect to the second hardware element outside a horizontal plane parallel to the first and to the second surface in the first operating condition, said signals generated by the first accelerometer including acceleration values along said first, second and third detection axes of the first accelerometer,
the second accelerometer is a triaxial accelerometer having first, second and third detection axes, configured to detect an acceleration of the first hardware element with respect to the second hardware element outside the horizontal plane, said signals generated by the second accelerometer including acceleration values along said first, second and third detection axes of the second accelerometer.

28. The device of claim 27 wherein in a second operating condition, the first surface is at a right angle to the second surface, and in which:
in the first operating condition, only the first detection axis of the first accelerometer is subject to gravitational acceleration and, in the second operating condition, only the second detection axis of the first accelerometer is subject to gravitational acceleration,
said processing circuitry, in operation, adjusts a weighting assigned to the first intermediate signal and a weighting assigned to the second intermediate signal as a function of an acceleration value detected along the third detection axis of the first accelerometer in a third operating condition in which the third detection axis of the first accelerometer is subject to gravitational acceleration.

29. The device of claim 17 wherein the signals generated by the first and second gyroscopes include a first and a second angular rate signal respectively, and the operation of calculating the second intermediate signal includes adding an angular change obtained as a function of the first and of the second angular rate signals to the result signal.

30. The non-transitory computer-readable medium of claim 24 wherein generating the result signal includes applying low-pass filtering to the first intermediate signal and high-pass filtering to the second intermediate signal.

* * * * *